July 24, 1956      P. M. PAPPAS      2,756,321
COMBINATION GAS AND ELECTRICALLY HEATED FRYER
Filed Sept. 22, 1953      3 Sheets-Sheet 3
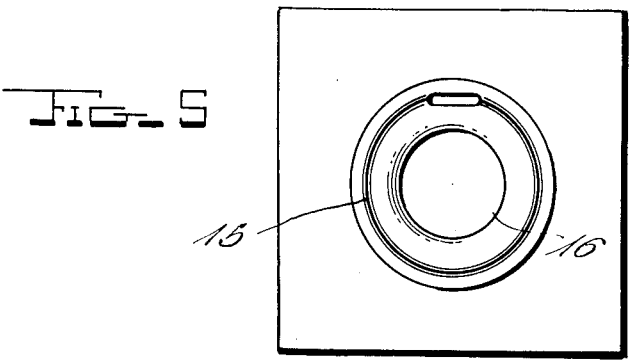
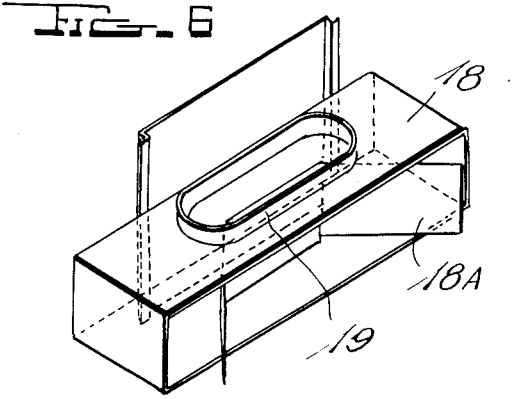
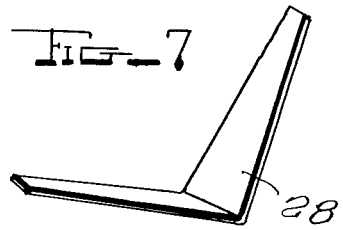
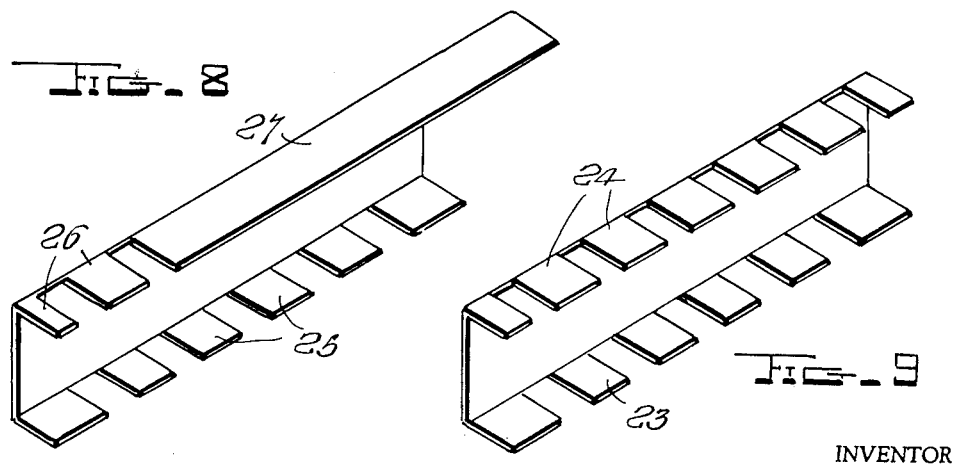
INVENTOR
Phillip M. Pappas,
BY
ATTORNEYS

United States Patent Office 2,756,321
Patented July 24, 1956

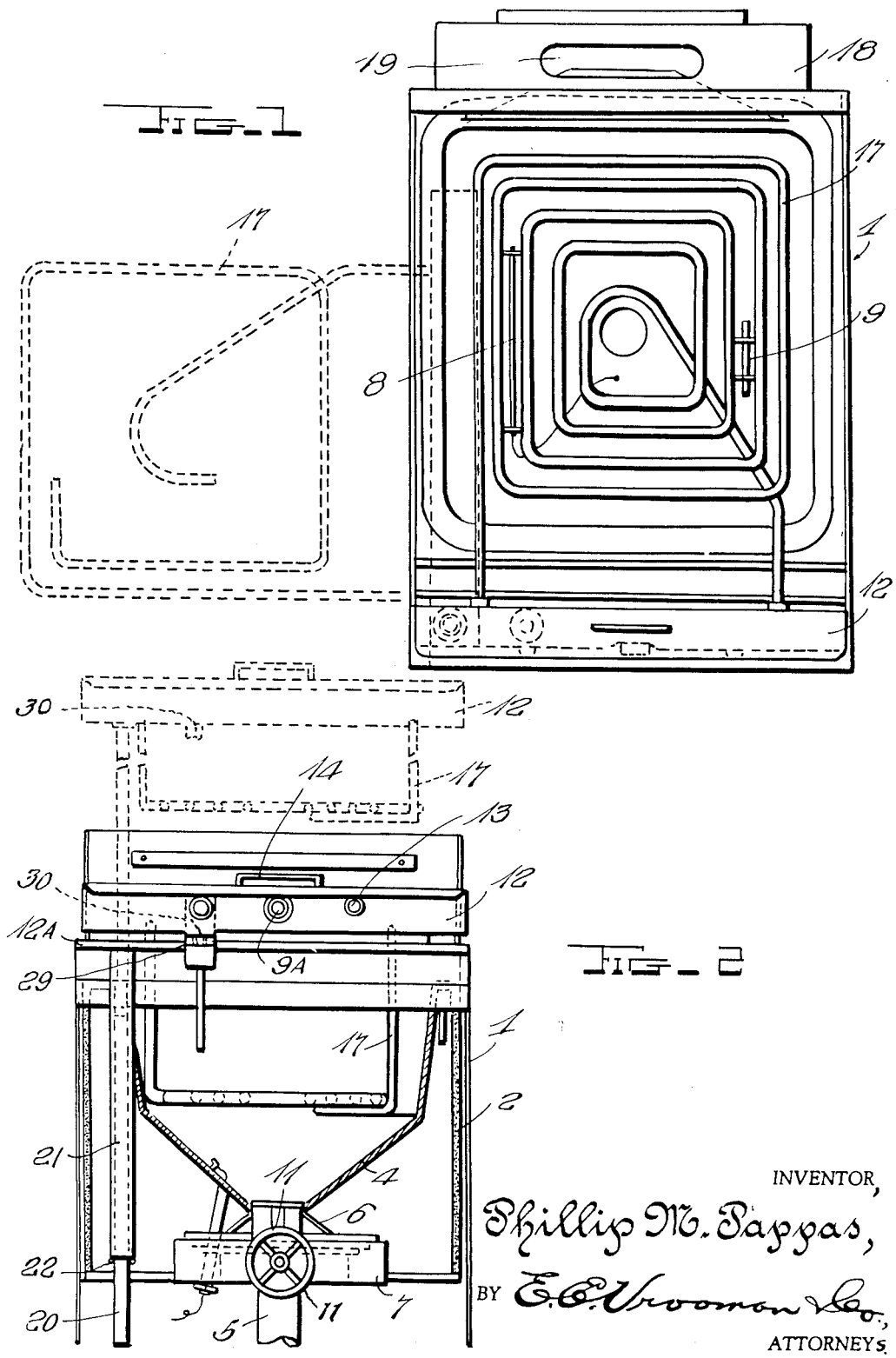

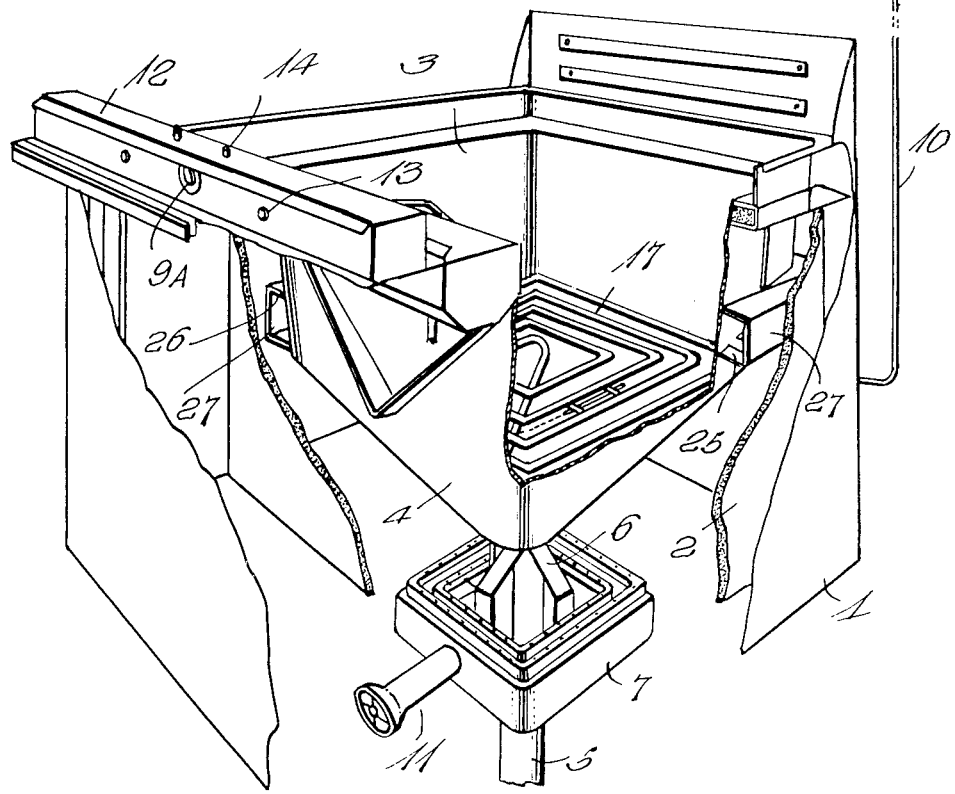
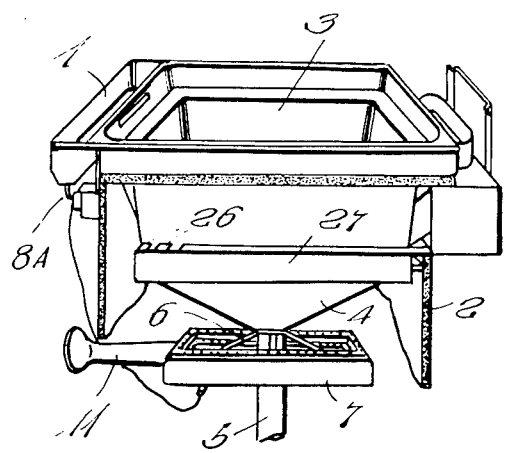

2,756,321

COMBINATION GAS AND ELECTRICALLY HEATED FRYER

Phillip M. Pappas, Houston, Tex.

Application September 22, 1953, Serial No. 381,543

5 Claims. (Cl. 219—44)

This invention relates to deep fryers, and more particularly relates to a combination gas and electrically heated deep fryer.

In a fryer heated solely by gas or by electricity it becomes more and more difficult to maintain efficiency as the energy input is increased whether gas or electric. In frying full basket loads of raw French fry cut potatoes approximately 40% of the total weight is water that must be driven off in the form of steam before the potatoes are done. This requires a tremendous amount of heat energy as foods to be properly fried should be cooked in fat that is maintained around 350° F. and when this load of cold raw potatoes is placed in fat at this temperature the fat temperature drops faster than it can be restored by the heating means of the fryer. Now if the fat temperature in the frying vessel drops from 350° to say, 275° during this frying process the foods being fried tend to soak or absorb grease which ruins the food being fried, and makes it hard to digest. In addition, the absorption weight of the fat in the food being fried increases to the extent that the fried foods are costing the operator more than they should due to the grease that is lost and must be replaced in the fryer to take care of the excessive absorption rate.

To offset this temperature drop when foods are fried and increase the recovery rate of the fryers which we manufacture, the B. t. u. gas heat input has been increased by 50%. This greatly increased gas input was difficult to utilize efficiently as efficiency becomes much harder to maintain with every small increase in input. A high efficiency has been attained by means of baffles placed around the exterior sides of the fry kettle which will not only absorb and utilize the highest possible percentage of the heat from the burner but also these baffles balance the heat and draft necessary for efficient combustion in an externally heated vessel where the flue must be of necessity be taken out of the top portion of one of the four sides of the burner chamber. Before this balancing the burner received an overdraft on the side parallel with the flue outlet whereas the two adjacent sides receive somewhat less draft and the front side opposite the flue outlet received an underdraft due to its greater distance from the flue outlet. To balance this draft condition and provide additional metal heating surface, there are employed four different baffles which are welded to the kettle wall and further to prevent an overdraft on the rear portion of the kettle a baffle was inserted into the flue box outlet that restricted the outlet area available to the rear side of the pot to one-fourth of the total flue outlet area. This increased the draft of the flue along the sides of the kettle and at the front. Now even with this greatly increased gas input, when the user loads the fry baskets with 10 or 12 pounds of cold raw potatoes the fat temperature will drop 70 to 80° before it pauses and then starts to move upward. This slows the frying process, increases the fat absorption rate by causing the potatoes to soak grease. This can, of course, be eliminated by frying a lesser load but same will cut the hourly capacity of the fryer. One might assume that the initial temperature of the fat could be raised to say, 400° and the 70 to 80° temperature drop would still leave the fat sufficiently high to prevent much grease absorption; however, doing this would cause the potatoes to become dark brown on the outside and still uncooked on the inside.

To increase recovery, we tried considerably more gas heat input than the already high rate and same resulted with relatively little increase in recovery and further in order to prevent fat from scorching at the point of contact with the heated metal surface it is necessary to have a large metal surface area. If too much heat is applied to this metal heated surface area, its temperature will increase to the point where it will scorch the fat at the point of heat contact which will cause the fat to break down rapidly making it necessary to replace the large amount of fat in the fryer frequently. In other words, for each increase of heat input the heated metal surface area should be likewise increased so as to prevent fat scorching and quick breakdown.

It is for this reason that electric fryers with their immersion elements are also limited as to heat input. As the heating area of the element is limited within the fry pot especially in the view of the fact that provision should be made for the removal of the sediment from the foods being fried from the heating fat by means of a cold zone below the heated fat so that the food particles or sediment may fall by gravity into a relatively cooler area the importance of which is more fully described in my Patent 2,338,964.

In view of the difficulties inherent with increasing recovery speed of the externally heated gas fryer or on an internally immersion heated electric fryer, I finally became struck with the idea of wedding these two together bringing about a fryer of great recovery speed, of great fat economy and with many other great advantages over present day fryers.

To make further advantages of this combination gas and electric fryer, I have provided that the electric immersion unit be self-contained with its own thermostat, immersion heater and casing which is mounted on the externally heated gas fryer in a manner which makes it possible to remove the entire electric portion of the fryer so that quick replacement could be made and further the immersion unit is so mounted that it may be raised out of the fryer by lifting the electric casing box on the front of the fryer and swinging it outward. This makes for easy cleaning of the interior kettle. In addition the previous benefits of this combination gas and electric fryer, the user will receive a completely self-contained gas fryer with a thermostat controlling the operation of the burner in relation the fat temperature plus a complete self-contained electric immersion unit which will operate this electrical unit by thermostatic means in relation to the fat temperature. Now let us suppose the operator is using the fryer and the gas thermostat becomes defective. He can cut off his gas unit and still use the electric portion and be able to continue his frying with controlled fat temperature. If the electrical thermostat becomes defective, he can still use the gas burner of the fryer and have fat controlled temperature by means of the gas thermostat. This is very important as thermostats snapping on and off thousands of times as used in restaurants will become defective and when this happens there is no control of fat temperature on existing fryers. In deep frying it is very important that the fat temperature never exceed 400° as fat will rapidly deteriorate above this temperature and when the thermostat becomes defective the operator has no way of controlling the fat temperature as a result hundreds of pounds of fat can be destroyed before a new thermostat is installed in the fryer.

With this combination electric and gas unit this difficulty would be eliminated. Another great advantage is that the user may use the fryer solely on gas or solely on electricity during the off times whichever may have the cheaper operating cost in his particular area. For example, in the Pacific Northwest gas is relatively high per B. t. u. whereas electrical power is very reasonable. The user in this area during the peak times would, of course, use gas and electric power for this frying which would enable him to turn out a great amount of food in a small space. During his slower times, this operator could turn off the gas and operate the fryer on electricity. By the same token in a natural gas area such as Texas, gas operation would be cheaper and the user during his off time would use the fryer solely with gas by turning his electric thermostat to the off position. This would, of course, result in lowest possible operating cost. A further advantage would be that during electrical storms in the case of power failure the user would have his gas operated portion of the fryer to do his cooking and by the same token were the gas to be cut off for some reason the user could use electric heating means for the fryer. Another advantage would be in outlying areas where say gas was not presently available but would be in the future. The user would buy the fryer, use the electricity until such time as gas becomes available, then he would have both for his peak periods and be able to use the cheaper fuel as the case might be during his off time. One can easily see from the foregoing the many and great advantages of this combination gas and electric fryer.

In addition, the user would have a fryer capable of turning out in the same space twice the amount of food per hour of existing fryers for his peak hours. Further this fryer would not scorch and break down the fat as would a fryer solely heated by gas or solely heated by electricity as the combination internal and external heating provides greater metal surface heating area making dangerous metal surface and excessive temperatures unnecessary as they would certainly be if this capacity unit was attempted by either solely gas or solely electric heating means.

With the above and other objects in view, as will be hereinafter apparent, the invention consists in general of certain novel details of construction and assemblies of parts hereinafter fully described, illustrated in the accompanying drawings, and particularly claimed.

In the accompanying drawings like characters of reference indicate like parts in the several views and Figure 1 is a planned view of the invention.

Figure 2 is a front elevation thereof.

Figure 3 is an enlarged perspective view of the body of the invention, the view being partly broken away to show the interior arrangement.

Figure 4 is a perspective view taken from one side of the device.

Figure 5 is a detailed view showing the thermostat casing for the ventilating hole used around the electric and gas thermostat dials.

Figure 6 is a perspective view of the flue outlet box used therein.

Figure 7 is a perspective view of a certain front baffle used therein.

Figure 8 is a perspective view of a certain baffle at the left side of the pot.

Figure 9 is a similar view of the rear baffle.

In the present embodiment of the invention, as here disclosed, there is provided a fryer casing 1 having an internal insulation jacket 2. In this jacket 2 and having its sides spaced from the sides of the jacket is a fry pot 3. This fry pot has an inverted frusto-conical bottom. For this fry pot is, during operation, provided with a suitable quantity of cooking fat, grease, or oil and from the bottom of the fry pot extends a draw-off pipe for emptying the pot when desired. This pipe is provided with a controlling valve (not deemed necessary to be shown). From the center of the bottom 4 depends certain bracket members 6 which support a gas burner 7 of rectangular form.

At the junction of the bottom 4 and the side walls of the pot 3 there is supported an electrical heating element 17. A thermostat 9A controls the current passing through this heating element from the plugged connection 10. Also a thermostat 8A controls the flow of gas to the gas burner 7.

The burner 7 is provided with an air inlet 11, in the usual manner, to such devices. At the front of the device is provided an electric control box 12 interposed between the heater coils 17 to plug connection 10 and this control box has mounted thereon a switch 13 for turning current off and on from the coil 17.

Also there is provided a handle 14 fixed on top of the control box. In Figure 5 there is shown an enlarged portion of the control box including a recessed disc 15 for the electric thermostat and having a ventilating hole arranged to admit air around the electric thermostat.

In connection with the parts above described, there is provided an emersion electric element arrangement 17. At the rear of the upper part of the device, there is provided a flue box 18 having a flue outlet 19 and in this box is fitted a resrictive baffle 18A.

The member 12A carries this emersion electric element arrangement 17 as shown in Figure 2. Depending downwardly from member 18 is a rod 20 that passes through a tubular guide 21 provided with spring actuated balls 22 preventing rod 20 from sliding downwardly into tube 21 until a downward pushing action is made. When in this position, the arrangement 17 may be swung outwardly as shown in Figure 1 for easy cleaning of this interior fry pot.

At the back of the pot there is provided a baffle plate having a series of spaced fingers 23 along its lower edge and a second series of fingers 24 along its upper edge, the fingers 23 and the fingers 24 being staggered in vertical position. These fingers project across the space between the pot and the outer member of the device. Consequently, circulation upward in the back of the pot is considerably retarded. On each side of the pot is a similar arrangement provided with spaced fingers 25 projecting from the lower edge and a few fingers, as at 26, projecting from its upper edge at the rear thereof. Extending upwardly from the finger 26 is a flange 27. The fingers 25, 26 and the flange 27 all extend across the space between the pot and insulation jacket 2. Under these circumstances the circulation of air upwardly between the pot and the jacket 2 of the casing is such that it is considerably retarded in the rear so that the hot air tends to circulate along the sides of the pot and then upwardly to escape through the opening 19. In other words, the draft produced by the gas burner maintains an even heating of the exterior of the pot on all four sides.

In Fig. 7 there is shown a V-shaped baffle 28 which is located on the front portion of the exterior of the fryer pot.

It will be noted that when the electric heating arrangement is lifted upward for cleaning, the supply of electric energy to the control box and heating element is automatically disconnected as the male plug unit of junction box 30 is removed from the female electric supply receptacle 29. This is a safety feature that will prevent the user from becoming accidentally burned or shocked when cleaning the element.

Now with the construction just described, it will be seen that the uniform heat both within and without the pot is maintained. Furthermore, it will be seen that in the event of failure of either the electricity or the gas heating elements the pot under no circumstances will be chilled and the materials being cooked will not become impregnated with grease or the like in which it is immersed.

In the operation of the device the fat or oil material within the pot is heated to frying temperature prior to the immersion of any material to be cooked therein, these being at the time not less than that necessary for proper cooking of the material without absorption of grease or cooking liquid. Obviously, as a quantity of relatively cool material is then deposited in the pot and immersed, the temperature of the cooking fluid will be reduced. However, with the action of the thermostats, will be such that the other thermostat will act to provide additional heat since it will be set for a minimum temperature of the fluid in the pot and will act when the temperature drops below the set minimum to immediate action to supply additional heat. Thus at no time for more than an immaterial instant will the cooking fluid be lowered beyond the proper temperature.

In operation, first of all, the fat is put into the pot up to a level of several inches from the top edge of the pot. The gas thermostat and the electric thermostat would then be set for the proper frying temperature, say 350 degrees. The electric current would then flow through the resistance element 17 located within the fat and the gas burner 7 would operate heating the four exterior sides of the fry pot and transmitting said heat to the cooking oil. When the fat temperature reached the dial settings on the two thermostats, the gas burner would automatically cut off and so too, would the immersion element. Now the combined heat of the external gas burner and the internal immersion element would bring the fat to the 350 degree frying temperature very fast. At this time, cold food in the baskets would be placed in the pot and as this would lower the temperature of the fat the electric thermostat would open the electric current circuit and start the resistance immersion heating element to heat and the gas thermostat with this temperature drop would turn on the gas to the gas burner 7 applying heat to the exterior of the pot. The combined heat would speedily bring the temperature of the fat upward toward the correct frying temperature of 350 degrees and maintain it there during the frying period. The combined heat would cut down the temperature of the drop caused by the cold foods and would make possible utmost poundage of hourly production of fried foods. Now it may be readily seen that by setting the gas and electric thermostat dials at various temperatures, it would be possible to have the electric heating element cut in only after a certain temperature drop. For example, if the gas thermostat dial setting was 350 degrees the electric thermostat dial setting was 325 degrees, the electric element would not cut in until a 25 degree temperature drop had taken place; however, for maximum preheat speed and for maximum recovery speed in the cooking of foods, both thermostats would be set with the same dial setting so that the gas exterior heat and the electric internal heat were supplied to the fat simultaneously.

Also it is to be noted that the spring actuated balls 22 prevent accidental removal of the heating unit assembly when same is in its downward location on the front panel of the frying unit. These spring actuated balls are located within rod 20 and push outward at the lower end of the tube 21, thus they snap out in this position when the electrical unit is pushed downward to its lowest position where the control box 12 is against the top surface of the frying unit.

What is claimed is:

1. An outer casing, an inner casing for containing material to be cooked, said inner casing being spaced at its side and ends from the outer casing, removable electric heating means in the inner casing to heat the contents thereof, outer gas heating means beneath the outer casing to heat the space between said casings, escape means effecting escape of the heat derived from the last means from between said casings, and baffle plates between said outer and inner casings arranged to effect even distribution of the heat from the space between the casings over the outer surface of the inner casing.

2. An outer casing, an inner casing for containing material to be cooked, said inner casing being spaced at its sides and ends from the outer casing, removable electric heating means in the inner casing to heat the contents thereof, outer gas heating means beneath the outer casing to heat the space between said casings, escape means effecting escape of the heat derived from the last means from between said casings, and baffle plates between said outer and inner casings arranged to effect even distribution of the heat from the space between the casings over the outer surface of the inner casing, said escape means being positioned at one end of the space between the casings, the baffles at the opposite end of said space being arranged to substantially resist air flow and the baffles between said end being arranged to limit air flow over the sides of the inner casing.

3. An outer casing, an inner casing for containing material to be cooked, said inner casing being spaced at its sides and ends from the outer casing, removable electric heating means in the inner casing to heat the space between said casing, escape means effecting escape of the heat derived from the last means from between said casings, and means equalizing the heat on the inner casing derived from the last means from between said casings, and baffle plates between said outer and inner casings arranged to effect even distribution of the heat from the space between the casings over the outer surface of the inner casing, said first heating means constituting a resistance coil and the second heating means being arranged beneath the bottom of the outer casing.

4. An outer casing, an inner casing for containing material to be cooked, said inner casing being spaced at its sides and ends from the outer casing, removable electric heating means in the inner casing to heat the contents thereof, outer gas heating means beneath the outer casing to heat the space between said casings, escape means effecting escape of the heat derived from the last means from between said casings, and baffle plates between said outer and inner casings arranged to effect even distribution of the heat from the space between the casings over the outer surface of the inner casing, said escape means being positioned at one end of the space between the casings, the baffles at the opposite end of said space being arranged to substantially resist air flow and the baffles between said end being arranged to limit air flow over the sides of the inner casing, said first heating means constituting a resistance coil and the second heating means being arranged beneath the bottom of the outer casing.

5. An outer casing, an inner casing for containing material to be cooked, said inner casing being spaced at its sides and ends from the outer casing, removable electric heating means in the inner casing to heat the contents thereof, outer gas heating means beneath the outer casing to heat the space between said casing, escape means effecting escape of the heat derived from the last means from between said casings, and baffle plates between said outer and inner casings arranged to effect even distribution of the heat from the space between the casings over the outer surface of the inner casing, said first heating means constituting a resistance coil and the second heating means being arranged beneath the bottom of the outer casing, and consisting of a gas burner in central position below the outer casing.

References Cited in the file of this patent

UNITED STATES PATENTS

| Re. 23,709 | Page | Sept. 1, 1953 |
| 919,843 | Fish | Apr. 27, 1909 |
| 1,383,108 | Hadaway | June 28, 1921 |
| 1,406,850 | Hadaway | Feb. 14, 1922 |
| 1,408,634 | Passmore | Mar. 7, 1922 |
| 2,109,212 | Ehrgott | Feb. 22, 1938 |
| 2,219,949 | Childs | Oct. 29, 1940 |
| 2,597,695 | Braski | May 20, 1952 |
| 2,655,144 | Keating | Oct. 13, 1953 |

FOREIGN PATENTS

| 429,770 | Great Britain | June 6, 1935 |
| 271,590 | Switzerland | Jan. 16, 1951 |